(No Model.)

J. H. BATCHELDER.
EGG CASE MACHINE.

No. 575,096. Patented Jan. 12, 1897.

(No Model.)
7 Sheets—Sheet 2.

J. H. BATCHELDER.
EGG CASE MACHINE.

No. 575,096.                          Patented Jan. 12, 1897.

Fig. 2.

(No Model.) 7 Sheets—Sheet 3.

J. H. BATCHELDER.
EGG CASE MACHINE.

No. 575,096. Patented Jan. 12, 1897.

(No Model.)  7 Sheets—Sheet 4.

J. H. BATCHELDER.
EGG CASE MACHINE.

No. 575,096.  Patented Jan. 12, 1897.

(No Model.) 7 Sheets—Sheet 5.

J. H. BATCHELDER.
EGG CASE MACHINE.

No. 575,096. Patented Jan. 12, 1897.

Attest:
A. D. Lawrence
J. F. Groat

Inventor:
James H. Batchelder
By J. M. St. John,
Atty.

(No Model.) 7 Sheets—Sheet 6.
J. H. BATCHELDER.
EGG CASE MACHINE.

No. 575,096. Patented Jan. 12, 1897.

Attest:
A. D. Lawrence
J. F. Groat

Inventor:
James H. Batchelder
By J. M. St. John
Atty.

THE NORRIS PETERS CO., PHOTO-LITHO., WASHINGTON, D. C.

(No Model.)
7 Sheets—Sheet 7.

J. H. BATCHELDER.
EGG CASE MACHINE.

No. 575,096.  Patented Jan. 12, 1897.

Attest
A. B. Lawrence
J. F. Groat

Inventor
James H. Batchelder
By J. M. St. John
Atty

UNITED STATES PATENT OFFICE.

JAMES H. BATCHELDER, OF TAMA, IOWA.

EGG-CASE MACHINE.

SPECIFICATION forming part of Letters Patent No. 575,096, dated January 12, 1897.

Application filed August 10, 1895. Serial No. 558,827. (No model.)

*To all whom it may concern:*

Be it known that I, JAMES H. BATCHELDER, a citizen of the United States, residing at Tama, in the county of Tama and State of Iowa, have invented certain new and useful Improvements in Egg-Case Machines; and I do hereby declare the following to be a full, clear, and exact description of the invention, such as will enable others skilled in the art to which it appertains to make and use the same.

The object of this invention is to produce a machine capable of automatically punching, cutting off, and putting together the strawboard strips to form the sets of cells used for the transportation and storage of eggs.

The invention is embodied in the novel features of a complex machine, and will be hereinafter fully set forth and claimed, reference being had to the accompanying drawings, forming a part of this specification, in which—

Similar letters and numerals of reference indicate corresponding parts.

Figure 1:
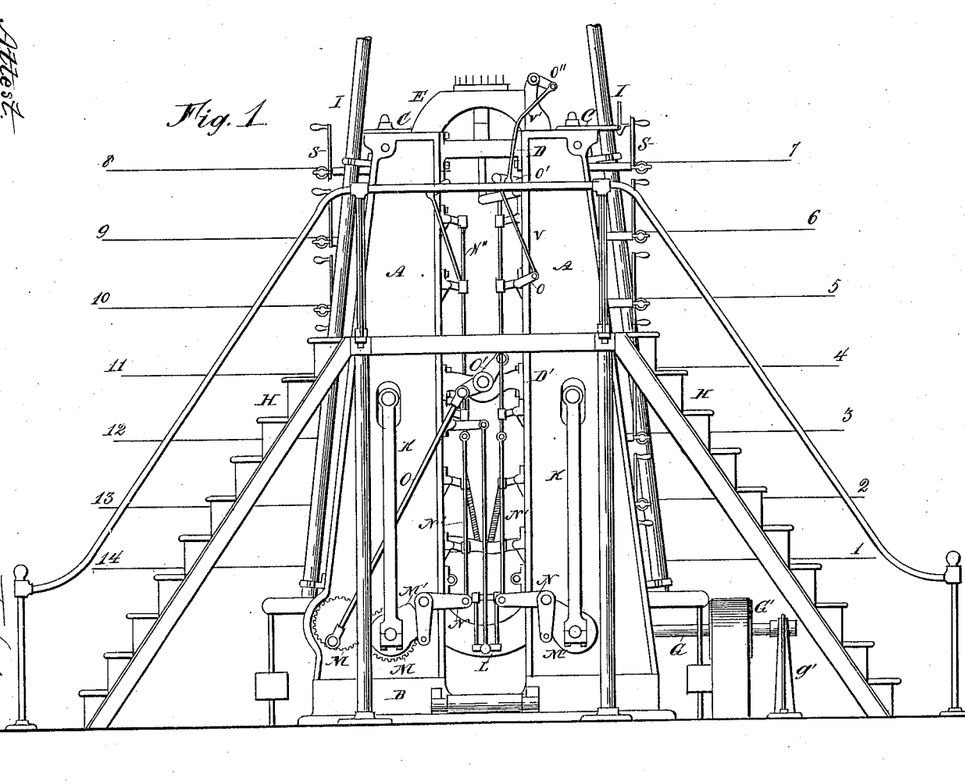
Figure 1, Sheet 1, is a front elevation of a machine embodying my invention.

Referring now to Fig. 1, the general features of the machine will be described.

On a suitable base B are mounted four upright castings A A, tied across the top by two cross-pieces C C. These parts constitute the essential features of the main frame. The vertical inner faces of the uprights A A are connected by bridges D D' D'', forming suitable bearings for parts of the mechanism, as will hereinafter more fully appear.

To the inner sides of the uprights are connected two tracks E E. (See, also, Fig. 11.) These tracks are of about the same length as the height of the machine, with semicircles at each end, and form the guides for the carriers mounted to run on travelers between the parallel ribs of said tracks. On suitable transverse shafts near the lower end of the machine are mounted a pair of gears F F, (see Fig. 2,) and on the opposite ends, Fig. 1, are cams M' M'. The gears engage pinions $f f$ on a shaft G, mounted in bearings $g\ g\ g'$. On this shaft is secured a suitable pulley G', by means of which motion is imparted to the machine.

Figure 3:
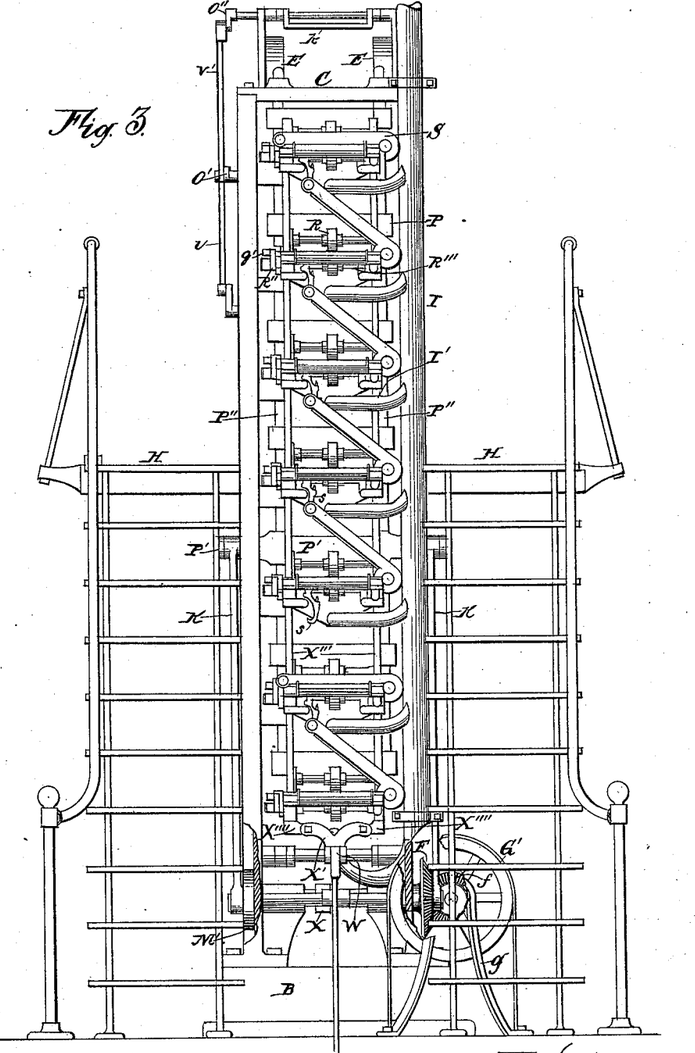
Fig. 3, Sheet 3, is a side elevation of the same.

To suitable wrists secured to the gears F F and cams M' M' are connected four rods K K, which at the upper ends connect with the ends of two punch-heads P P, Fig. 3, projecting through suitable openings in the uprights A A. These and all the other punch-heads are connected to four vertical guide-rods P'' P'' and move up and down simultaneously. Owing to the great size and height of the machine, a stairway H is provided at each side to give access to all parts of it.

Figures 12, 13, 14, 15, 16:
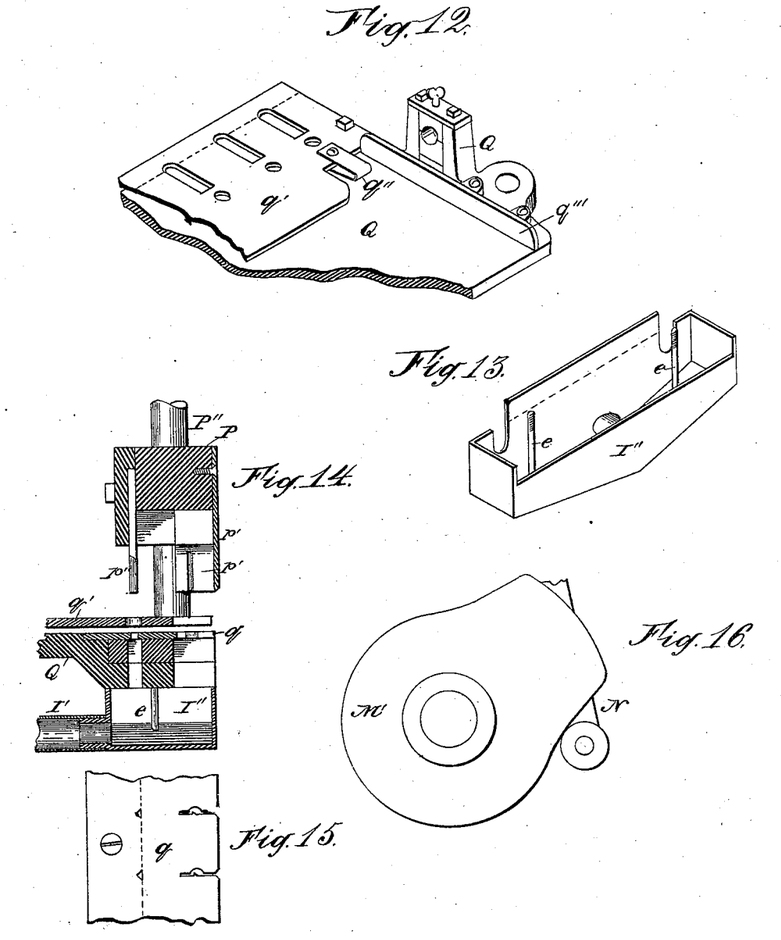
Fig. 12, Sheet 7, is a fragmentary view in perspective of one of the punching and shearing tables.
Fig. 13 is a perspective view of a dust-box to receive the chips as punched from the strawboard.
Fig. 14 is a transverse section in a vertical plane of one of the punch-heads with auxiliary punch, die, stripper, and dust-box.
Fig. 15 is a fragmentary plan view of the die illustrated in section in Fig. 14.
Fig. 16 is a view of a feed-cam from the inner side.

Two pipes I I connect by branches I' I' with dust-boxes under each die, Figs. 3 and 14, and lead to an exhaust-fan (not shown) to carry away all chips and dust from the machine.

The numerals 1 to 14 indicate as many strips of strawboard supposed to come from as many rolls of the same mounted on a reel-frame, which forms no essential feature of this invention, and is therefore not shown.

Figure 5:
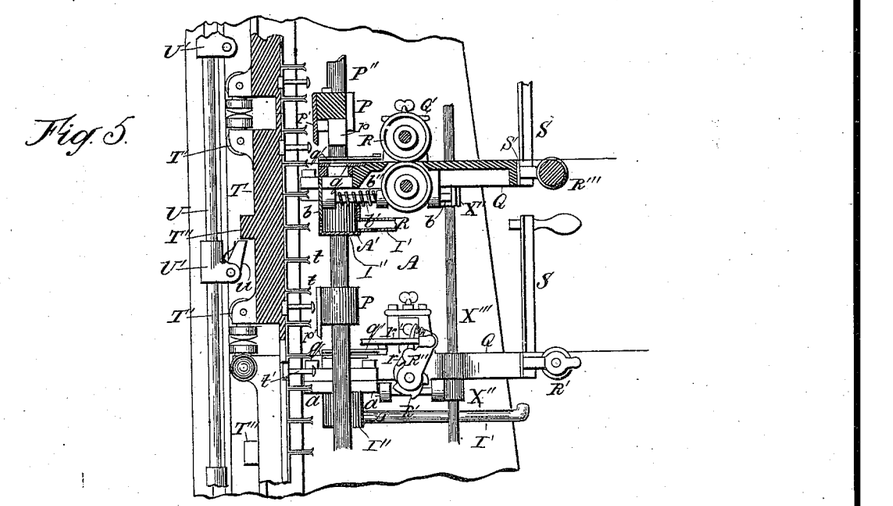
Fig. 5, Sheet 5, is a fragmentary elevation, the upper half of the figure being in section, showing the detail of the punching and shearing apparatus and the carriers which receive the severed strips.

The paper-feed is actuated by the cams M M' through bell-crank levers N N, connecting-rods N' N', and vertically-reciprocating rods N'' N'', connecting pivotally with a series of small bell-crank levers n n n n, connecting by rods r' r' with the feed apparatus shown in Fig. 5. This consists of the usual pair of feed-rolls R R, mounted in suitable bearings, forming a part of the table Q. To the shaft of one of these rolls is attached a ratchet R', and adjacent thereto an oscillating crank-arm R'', provided with a pawl r, engaging said ratchet. The tension of these feed-rolls is adjusted in the usual way in the bearings Q'.

One of the vertical rods N'' is utilized for transmitting motion to the mechanism for making the quarter-turn of the strip-carriers, its movement being augmented by a lever n'. (See Fig. 4.) This lever connects by a suitable link d' with the stem of the quarter-turn apparatus, which will be fully described hereinafter.

Figure 2:
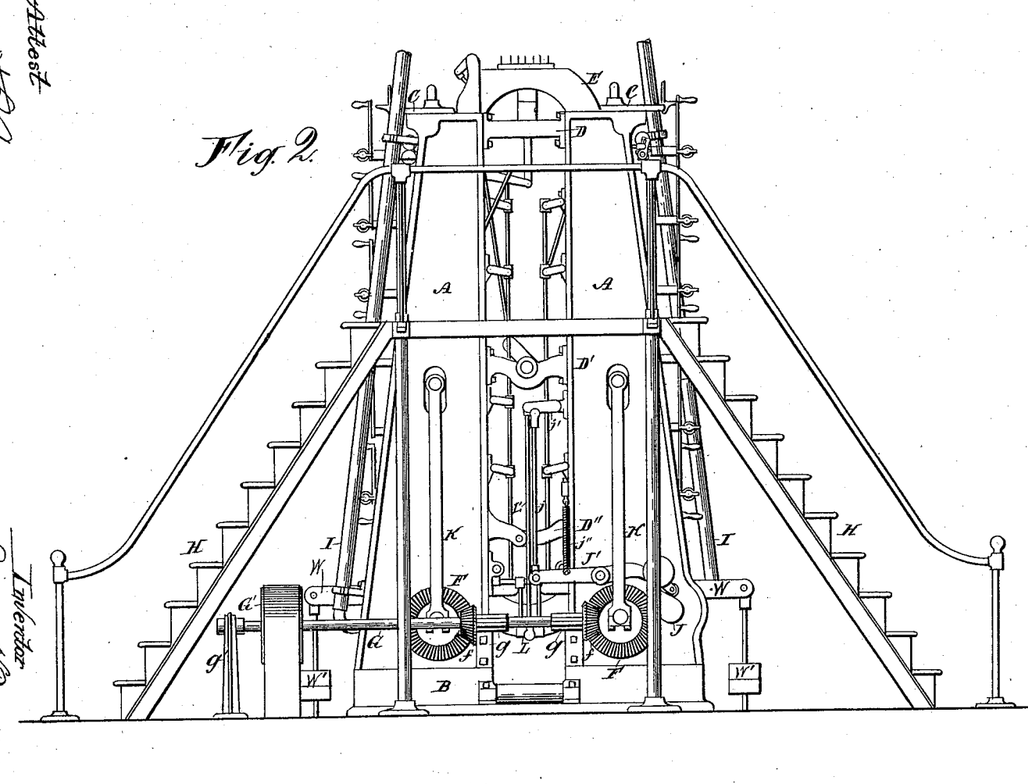
Fig. 2, Sheet 2, is a rear elevation of the same.

Near the top of the machine, Figs. 1, 2, and 3, is pivotally mounted a stirrup-shaped lever k, employed to push in one of the strips not bottomed in the carrier-forms by the plungers elsewhere provided for that purpose. This is actuated by the feed mechanism through the medium of the crank-arms o o' o'' and rods v v', Fig. 1.

Behind one of the cams M' is mounted a gear M, meshing with a similar gear M on a suitable shaft adjacent thereto. This latter gear is provided with a crank-wrist, to which is connected a rod O, which connects at the other end with a crank O', mounted on a rock-shaft on the bridge D'. Another crank V on this shaft (shown in Fig. 4) imparts motion to the carrier-feed apparatus. This consists, essentially, of a vertical guide-rod U', sliding in suitable bearings attached to the machine-frame and connected to the crank V by a rod U''. To this guide-rod is rigidly attached another rod U, on which are mounted a series of pawls u u u, which engage intermittently with the central lug T'' of the carriers and push them upwardly on one side of the machine, those on the other side descending of their own weight. At the opposite end of this gear-shaft is a cam J, Fig. 2, which imparts intermittent motion to an oscillating arm J'. The inner end of this arm connects by a suitable rod j with a crank-arm j', and thence, by a rod L', with the ejector L. (More fully illustrated in Fig. 11.)

The foregoing description has had more special reference to external parts and actuating mechanism shown in Figs. 1 and 2. A more detailed description will now be given of the machine and its various functions.

Figure 4:
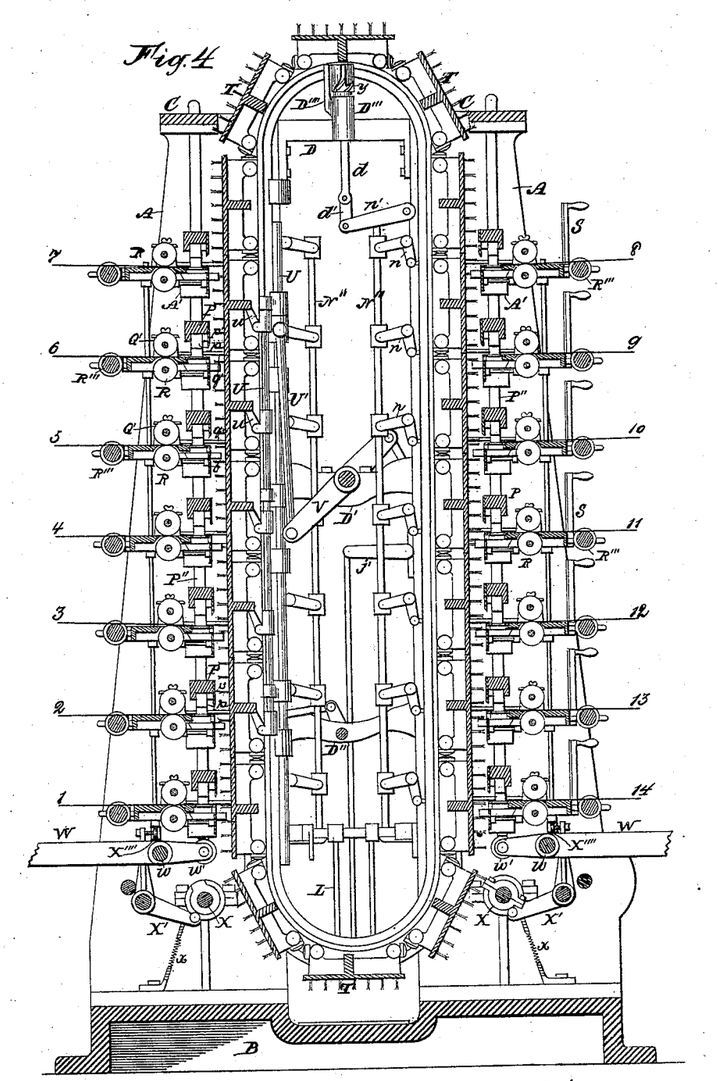
Fig. 4, Sheet 4, is a transverse section of the machine in a vertical plane central thereto, some of the minor details, such as the dust-boxes, being omitted.

Referring to Fig. 4, it will be seen that the inner sides of the uprights A A are provided with lugs A' A', which form the bearings for the guide-rods P'' P'', to which the punch-heads P P are secured. These bearings have lateral lugs a a, to which are bolted the tables Q Q. (More fully illustrated in Fig. 5.) The lower ends of these guide-rods rest on rollers w' w' at the ends of arms W W, pivoted on a transverse shaft w. To the outer ends of these arms are connected heavy weights W' W' to counterbalance the weight of the punching apparatus.

To the tables, Fig. 5, are connected the paper-feed mechanism already described. The tables are also provided at the outer side with each a roll R''' to support the paper at this point. A shear S at the edge of the table admits of the paper being cut squarely off when necessary in starting a new roll or at other times, the width of the table between this line and the opposite side where the strip is cut off being an exact multiple of the width of the strip. It therefore becomes possible to start a new roll of strawboard without stopping the machine, the squared end of the new roll being abutted against the end of the stub and so fed forward. When not in use, the shear-blade S is suspended by gravity-hooks s s, pivoted to some part of the machine above, as to the table above. The blade S' is secured to the edge of the table itself.

At the opposite side of the table is the die q, slotted to correspond with the desired slit in the strawboard strips, the extreme inner edge of the die serving as a shear-blade, acting in conjunction with the blade p', attached to the punch-head, to sever the strip from the sheet.

On one side of the machine the slots are in the body of the die, with a continuous cutting edge some distance therefrom, as shown in Fig. 5. The dies on the other side of the machine are as shown in Fig. 15, the slots being from the edge inwardly. The purpose of this will be apparent when it is understood that on one side of the machine all the strips are fed into the carriers solid side first, while on the other side, after the carriers have been given a quarter-turn, the strips are fed in slotted side first, thus matching into the strips already in the form. These slots are given a little "lead" by notching at the outer extremity. This notch is formed in advance of the main slot by a triangular punch p'' and a similar hole in the die back just the width of the strip from the inner edge of the die, as indicated by the dotted line in Fig. 15. This admits of the strip being cleanly cut off at the edge of the die, as will be apparent.

The strawboard passes under a perforated plate q', which serves as a stripper and as a horizontal guide in connection with the die. To prevent the possibility of the corners of a new sheet of strawboard curling up and catching, the stripper is provided at each end (one only is shown) with a light spring q'' to hold the corner of the strawboard closely to the table.

One side of the table is provided with a guide q''' for one edge of the strawboard, preferably the edge farther away from the operator. This is of convenience in starting the new sheet of paper, but when once started the feed-rolls carry it straight.

Under each die is secured a dust-box I″, as by bolts e e. A thimble at one side of the box enters the branch pipe I′, through which the chips and dust deposited in the box are conveyed to the exhaust-pipes already mentioned.

To each table below the die is connected a plunger or pusher b to push the severed strip home in the holding-fingers of the form. This consists of a thin plate b, provided with guide-rods b′, mounted in suitable bearings on the under side of the table. A spring b″ on each rod holds the pusher in normal position, with its outer face flush with the cutting edge of the die. It is thrust forward by arms X″ on a vertical rock-shaft X‴. An intermittent partial rotation is given to these rock-shafts by a bell-crank lever X′, actuated by a cam X, secured to the main transverse shaft passing through each side of the machine. The upper end of the bell-crank lever is bifurcated and engages with short arms X⁗ at the lower ends of the rock-shafts. (See Fig. 3.) The bell-crank is held in contact with the cam by a spring x. The form of this cam is shown on the left side of Fig. 4 and is calculated to give a quick short stroke to the pusher, permitting it to return quickly to normal position. This quick motion of the pusher is important, as the strip is thrust home while moving forward in the form.

Near the inner edges of the uprights A A are secured the tracks E E, which have lateral parallel ribs E′ E′, forming a raceway for the travelers T′ T′ of the carriers T. A portion of the outer flange is cut away at the top, so as to allow the carriers to be successively lifted out of the raceway, turned one-quarter of a revolution, and dropped into the race again.

Figure 7:
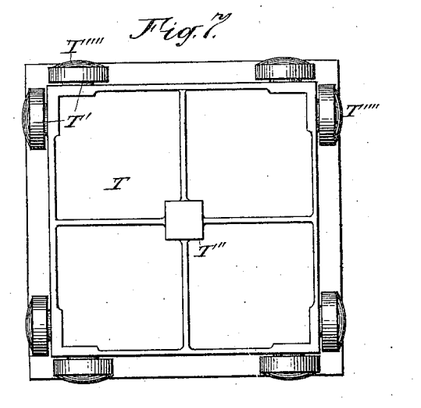
Fig. 7 is a similar view of the inner or back side of the same.
Figure 8:
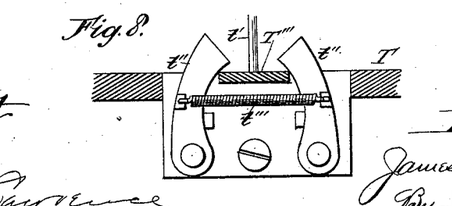
Fig. 8 is a fragmentary sectional view in the line $x\ x$ of Fig. 6, showing the detail of the latch that holds the ejector in normal position.

The carriers are in the nature of trucks, each provided with eight traveler-wheels, so as to run in line with any side of the rectangular table, serving as a form for the cell-strips. In the machine under consideration there are twenty of these carriers, the total length of the raceway being equal to the total extreme diameters of the carriers, so that when abutting closely they just fill the raceway. In moving around the semicircles at each end of the track the carriers assume a constantly-varying position with respect to each other, and to preserve the same relative distance on the curve as on the straight portion of the track the abutments of the carriers should be arcs of circles having the same centers as the travelers. A simple form of abutment is shown in Fig. 7, being the rounded heads of the studs T⁗ T⁗, on which the travelers turn.

Each carrier is provided with a rectangular stud or lug T‴ in the center at the back side. The pawl u on the vertically-reciprocating rod U engages with this lug and feeds the carrier forward, as already described.

On the face of the carrier-table are mounted a double series of spring fingers or clamps t t t t, adapted to hold in either position of the carrier the strips fed into them. These are rectangular angle-plates of thin spring metal, as brass, secured to the face of the carrier-table, with the upturned portions adjoining each other and bent outwardly at the tips to give easy entrance of the strips, as illustrated in Figs. 5 and 6.

Figure 6:
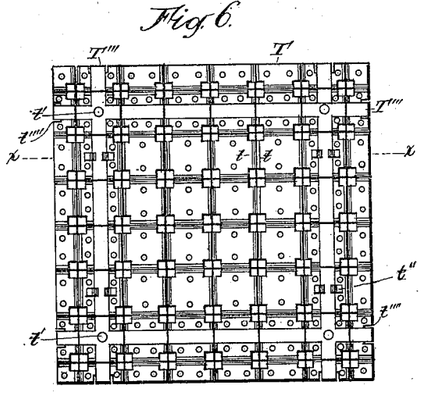
Fig. 6 is a plan view of the outer side of the strip-carrier.

In Fig. 6 the intersecting series of lines represent the strawboard strips, the small adjacent squares being portions of the carrier-table, showing between the notches bottom plates of the clamps t t.

In the face of the carrier-table, between rows of strip-holders, is set the ejector T‴, a rectangular frame with ends projecting to each side of the table. The frame is guided in and out of its seat by studs t′ t′, passing through holes in the frame and secured in the table, a head on each stud preventing displacement of the frame. Notches t⁗ t⁗ in the table permit the engagement with the ends of the frame of the ejector-forks hereinafter to be described.

Figure 11:
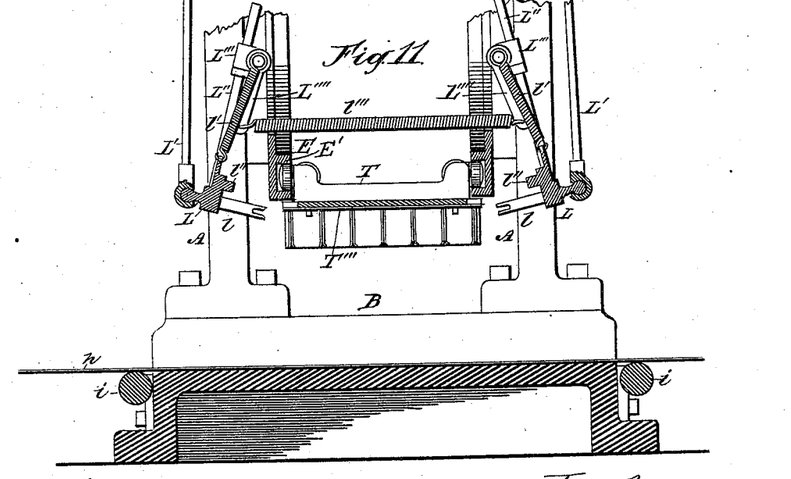
Fig. 11 is a fragmentary transverse section central to the machine, showing the detail of the mechanism for ejecting the finished set of cells.

The frame is held in normal position by latches t″ t″ with inclined faces, hinged to lugs at the back side of the table and connected by a spring t‴. The inclined faces of the latches allow the frame to be pushed in and out, but the tension of the spring is sufficient to hold it in its seat. The mechanism for ejecting this frame is shown in Fig. 11. It consists of a head L, provided with a pair of forks l l, coinciding with the notches in each side of the carrier-table. This head connects by a ball-and-socket joint with the rod L′, which, through connected mechanism, is actuated by the cam J, Fig. 2. A spring j″ holds the traveler of the arm J′ to the face of the cam. The head is also provided with a pair of guide-rods L″, moving freely in bearings L‴ on a cross-shaft journaled to the frame of the machine. A spring l′ draws the head upwardly, and collars on the guide-rods limit the movement in this direction.

To each of the shafts is attached a crank-arm L⁗, connected across the machine by a tension-spring l‴. The inward movement of the heads and forks is limited by a stop l″ on each head, which strikes the face of the track E.

The operation of the device will be readily understood. As the rod L′ moves downwardly the forks l l swing inwardly and engage with the ends of the frame T⁗, being drawn inwardly by the spring l‴. On reaching the limit of inward movement the forks move straight down, carrying the ejector-frame with them and pushing out the finished set of cells held in position by the clamping-fingers of the carrier-table. The cell-case falls on a moving apron h, supported by rolls i i, and is conveyed away from the machine. On the further movement of the cam J the motion of the ejector-forks is reversed and the ejector-frame returns to normal position.

Figures 9, 10:
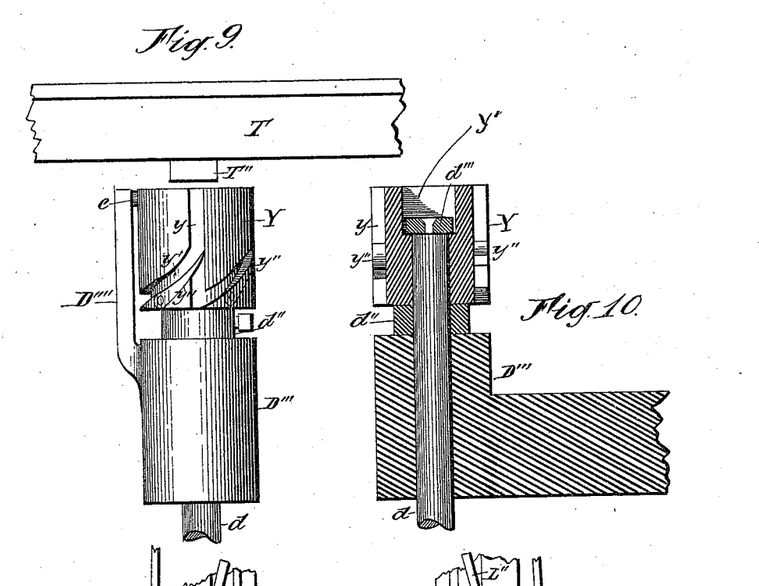
Fig. 9, Sheet 6, is a fragmentary elevation showing the device for turning the carriers one-quarter of a revolution.
Fig. 10 is a transverse section of the same in a vertical plane.

A simple device for giving the quarter-turn to the carrier-tables successively is illustrated in Figs. 9 and 10. In a suitable bearing $D'''$, forming a part of the bridge D, is mounted a vertically-moving shaft $d$, connecting at the lower end by a link $d'$ with the crank-arm $n'$, as before mentioned. At the upper end of this shaft is pivotally mounted a cylindrical cam Y, having in the upper end a central rectangular socket $Y'$ to engage the lug $T''$ of the carrier-table. In the periphery of the cam are four equidistant longitudinal grooves $y$, and leading from each to another is a spiral groove $y'$. A pivoted gravity-gate $y''$ closes the longitudinal groove about midway. An arm $D''''$ extends up from the bearing $D'''$ to near the top of the cam, where it is provided with a stud or roll $c$, projecting into the groove. The cam is held in position on the shaft by a suitable collar $d''$ and washer $d'''$. The operation of the device will be readily seen. The cam moves straight upwardly a sufficient distance to carry the carrier-table out of the raceway. The roller $c$ then engages the gate $y''$ and turns the cam one-quarter of a revolution, the roller finally entering the lower end of the next longitudinal groove. The cam returns straight down to normal position, the gate lifting to allow the roll $c$ to pass.

As before suggested, the machine is adapted to cut strips from fourteen rolls of strawboard at practically the same time, and for this purpose each side of the machine is provided with seven sets of punch-heads, dies, &c. The initial strips are cut and formed on the side of the machine at the left in Figs. 2 and 4, the side on which the carriers ascend. The final strips are formed on the opposite side.

It will be noted, by reference to Fig. 5, that the carriers are arranged to successively overlap the various cutting-tables, so that roll No. 1 feeds into the topmost row of carrier-fingers, No. 2 into the second row from the top, No. 3 into the third, and so on. The same order is preserved on the opposite side of the machine. The feed of the carriers coincides with this order, that is to say, each successive table is presented with its upper row of clamps in position to take the strip from No. 1, the second row to No. 2, and so on. It follows, therefore, that the strips from one roll are always fed into the same row of clamps in all the carriers. The result is of course to make a complete set of thirty-six cells at each stroke of the punch-heads, (after first filling the carriers, of course.) This arrangement is further advantageous in the fact that certain strips of the set may be made of heavier material or a better grade of material than others. Thus, for example, the four outer strips (Nos. 1, 7, 8, and 14 of the series) may be of quite heavy material, the middle cross-strips (Nos. 4 and 11) of the same or a somewhat lighter grade, and the rest of the strips of very light stock. The product will be a cell-case abundantly strong, but considerably lighter as a whole than it would be possible to make of uniform strips having the same general strength.

It will also be noticed, by reference to Fig. 5, that the strawboard is fed directly into the carrier-clamps before the strip is cut off. This insures a positive insertion of the strip in the holders and avoids the necessity of providing auxiliary mechanism to catch and place the strip after being severed from the sheet.

The arrangement of the carrier-tables in a disconnected abutting series is of great practical importance, being of extreme simplicity, dispensing with connective apparatus, admitting of the use of a light easily-moved carrier, and facilitating its detachment from the series and removal from the machine for any purpose.

The operation of the various parts of the machine has already been described, and without further detailed description it may be said that the machine is so geared and its cams are so set and timed as to produce the following results, nearly all successively.

The strawboard is first fed forward and into the holding fingers or clamps, (after having been punched.) The punch-head then descends and cuts off this strip and punches the succeeding strip. The carriers then move upwardly on one side and downwardly on the other, and while so moving the auxiliary feed pushes the strip home. On approaching the top of the machine the strip partially inserted by the upper pair of the first series of feed-rolls (No. 7) is pressed home by the supplemental feed-lever $k$. On reaching the extreme upper end of the track the carrier, which lies horizontal, is lifted out of the raceway, turned one-quarter, and returned to normal position. The descending carriers are filled successively, the slots of the strips on this side interlocking with the slots of the strips in the carriers. Finally, the completed cell-case stops at the bottom end of the track and is pushed out by the ejector, as described.

Having thus described my invention, I claim—

1. The combination with intermittently-moving carriers for the slotted strips, of a number of punch-heads equal to the whole number of strips in the cell-case, adapted to punch and cut off the strips, and mechanism for feeding said strips into the carriers.

2. The combination with a plurality of punch-heads adapted to punch and cut off singly the total number of strips in the cell-case, at each movement of said punch-head, mechanism adapted to feed the strip material under the punches and a plurality of strip-carriers, equal to or greater than the number of punch-heads, adapted to receive the strips singly and progressively, whereby they are filled on completing the circuit of all the punch-heads, as described.

3. The combination with a series of punch-heads equal in number to the number of strips in the cell-case, mechanism adapted to feed the strip material under the punches and a series of intermittently-moving strip-carriers to receive the strips as cut off, said carriers having one cell-space of overlap as to said punch-heads, whereby each succeeding strip of the series enters a succeeding row of holders in said carriers.

4. The combination of a series of punch-heads equal to the whole number of initial strips of the cell-case, mechanism adapted to feed the strip material under the punches, another series of punch-heads equal to the number of final strips, and set opposite the first series, a series of strip-carriers moving successively in front of each punch-head, and means for turning each carrier a quarter-revolution after filling with the initial series of strips.

5. The combination with a punching and cutting table, substantially as described, of a shear to square the end of the paper of the old and new roll, the distance between said shear and the cut-off for the strip being an exact multiple of the width of the strip, whereby a new roll may be started without stopping the machine.

6. The combination with a pair of tracks, of a series of disconnected, abutting strip-carriers, mechanism for advancing them intermittently and mechanism for feeding the strip material and cutting and punching the same, substantially as described.

7. A strip-carrier having travelers each side, and adapted to run in line with either side of the carrier, and provided with abutments each side, in combination with suitable actuating mechanism therefor, and for feeding, cutting and punching the strips, substantially as and for the purpose set forth.

8. A strip-carrier having a pair of wheels on each of its four equal sides, abutments curved in the arc of a circle having the same center as each wheel, and fingers adapted to hold the strips in either direction on said carrier.

9. The combination with a carrier-table and holding-fingers substantially as described, of an ejector-frame seated in the face of said table, and spring-latches to retain the same in normal position.

10. The combination with a series of disconnected carriers, a track therefor having a gap therein, and a quarter-turning device adapted to lift a carrier out of its place, turn it one-quarter, and return it to the original place.

11. The combination with a carrier substantially as described, of a reciprocating cam having a partly direct and partly spiral upward course, and a direct descent, as described.

12. The combination with a carrier having an ejector-frame seated in the face thereof, ejector-forks adapted to engage therewith when the carrier is in the position to discharge the completed cell-case, and mechanism substantially as described for imparting an inward, downward, upward and outward movement to said forks.

13. The combination of a pair of vertically-reciprocating guide-rods, means substantially as described for reciprocating them, a series of punch-heads secured thereto, levers provided with rollers abutting on the lower ends of said guide-rods, and counterweights suspended from said levers, substantially as described.

14. The combination of a series of strip-carriers having backward projections thereon, a reciprocating feed-rod and one or more pawls mounted thereon, and adapted to engage with the projections of said carriers, and to move them a space equal to the entire width of the carrier.

15. The combination with a rotating cam and connected mechanism, of a reciprocating cam and a series of strip-carriers, the reciprocating cam having a spiral path through part of its upward movement, and a direct return path, and mechanism to engage the carriers, whereby it is adapted to lift them successively, turn them one-quarter around and return them to place.

16. The combination with a rotating cam and connected mechanism, substantially as described, adapted to impart inward, downward, upward and outward movement to a strip-ejector, of a strip-carrier having strip-retainers thereon, a strip-ejector seated in said carrier, and a pair of ejector-forks connected to the actuating mechanism described, and adapted to engage with the ejector seated in the carrier.

In testimony whereof I affix my signature in presence of two witnesses.

JAMES H. BATCHELDER.

Witnesses:
J. F. GROAT,
J. M. ST. JOHN.